(12) United States Patent
Lane et al.

(10) Patent No.: US 7,819,221 B1
(45) Date of Patent: Oct. 26, 2010

(54) LIGHTWEIGHT ACOUSTIC DAMPING TREATMENT

(75) Inventors: Steven A. Lane, Albuquerque, NM (US); Robert E. Richard, Albuquerque, NM (US); Steven F. Griffin, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 502 days.

(21) Appl. No.: 11/239,440

(22) Filed: Sep. 27, 2005

(51) Int. Cl.
*F01N 1/06* (2006.01)
*F01N 1/22* (2006.01)
*E04B 1/82* (2006.01)
*B64C 1/40* (2006.01)
*F01N 1/00* (2006.01)
*E04B 1/74* (2006.01)

(52) U.S. Cl. .................. 181/206; 181/295; 244/1 N

(58) Field of Classification Search ............... 181/206, 181/207, 284, 295, 271, 219; 244/1 N; 138/30
See application file for complete search history.

(56) References Cited

U.S. PATENT DOCUMENTS

| 1,972,005 | A | * | 8/1934 | Berbeck | 244/119 |
|---|---|---|---|---|---|
| 2,111,326 | A | * | 3/1938 | Norris | 52/275 |
| 2,919,715 | A | * | 1/1960 | Rockwell | 137/549 |
| 4,228,869 | A | * | 10/1980 | Bschorr | 181/286 |
| 4,255,908 | A | * | 3/1981 | Rosenberg | 52/2.12 |
| 4,314,621 | A | * | 2/1982 | Hansen | 181/233 |
| 4,452,230 | A | * | 6/1984 | Nelson | 126/621 |
| 4,523,612 | A | * | 6/1985 | Kuklo | 138/30 |
| 4,570,748 | A | * | 2/1986 | Ghibu et al. | 181/286 |
| 4,629,432 | A | * | 12/1986 | Dyrkorn et al. | 440/52 |
| 4,773,190 | A | * | 9/1988 | Reade | 52/2.18 |
| 4,856,827 | A | * | 8/1989 | Delamare | 285/268 |
| 5,005,666 | A | * | 4/1991 | Fairborn | 181/102 |
| 5,281,777 | A | * | 1/1994 | Alton, Jr. | 181/151 |
| 5,299,522 | A | * | 4/1994 | Dixon, Jr. | 114/220 |

(Continued)

FOREIGN PATENT DOCUMENTS

JP 2009145739 A * 7/2009

OTHER PUBLICATIONS

Philip M. Morse & K. Uno Ingard, *Theoretical Acoustics*, pp. 489-490, Princeton University Press, Princeton, New Jersey, 1986.

(Continued)

*Primary Examiner*—Edgardo San Martin
(74) *Attorney, Agent, or Firm*—James M. Skorich

(57) ABSTRACT

A flexible membrane is attached to an internal wall of the fairing of a flight vehicle. The membrane is inflated with gas to achieve a shape that couples with and thereby attenuates the first acoustic resonance occurring within the volume enclosed by the fairing. A sensor senses the varying ambient atmospheric pressure during flight. A pressure regulating system includes an inflation valve and pressure relief valve. Based on the sensed ambient atmospheric pressure, this system adjusts the membrane's gauge pressure throughout the flight trajectory to maintain the desired coupling gauge pressure. Acoustic blankets can also be attached to the internal walls of the fairing to abate resonances having frequencies greater than 500 Hz. Inflating the membrane with helium enhances the attenuation otherwise obtained. Multiple membranes can be individually tuned to respectively attenuate multiple acoustic resonances.

15 Claims, 5 Drawing Sheets

U.S. PATENT DOCUMENTS

| | | | | |
|---|---|---|---|---|
| 5,348,270 | A * | 9/1994 | Dinh | 251/61.1 |
| 5,453,584 | A * | 9/1995 | Borello | 181/207 |
| 5,621,701 | A * | 4/1997 | Denaro et al. | 367/151 |
| 5,788,184 | A * | 8/1998 | Eddy | 244/121 |
| 6,053,827 | A * | 4/2000 | MacKay et al. | 473/566 |
| 6,098,744 | A * | 8/2000 | Kawamura | 181/198 |
| 6,116,375 | A | 9/2000 | Lorch et al. | |
| 6,151,396 | A | 11/2000 | Maier | |
| 6,244,541 | B1 * | 6/2001 | Hubert | 244/173.2 |
| 6,332,027 | B1 * | 12/2001 | Guilloud et al. | 381/71.1 |
| 6,394,394 | B1 * | 5/2002 | Raun et al. | 244/173.1 |
| 6,478,110 | B1 * | 11/2002 | Eatwell et al. | 181/207 |
| 6,485,205 | B2 | 11/2002 | Luque | |
| 6,493,180 | B1 | 12/2002 | Kang et al. | |
| 6,634,457 | B2 * | 10/2003 | Paschereit et al. | 181/229 |
| 6,739,425 | B1 * | 5/2004 | Griffin et al. | 181/171 |
| 6,802,386 | B2 * | 10/2004 | Koelle | 181/224 |
| 6,851,515 | B2 * | 2/2005 | Dussac et al. | 181/284 |
| 6,860,069 | B2 * | 3/2005 | Morris | 52/2.22 |
| 6,951,262 | B2 * | 10/2005 | West | 181/105 |
| 2002/0059959 | A1 * | 5/2002 | Qatu et al. | 138/30 |
| 2006/0257600 | A1 * | 11/2006 | Pilaar | 428/35.2 |
| 2007/0140518 | A1 * | 6/2007 | Larsen | 381/354 |
| 2007/0151796 | A1 * | 7/2007 | Heid | 181/207 |

OTHER PUBLICATIONS

Leo L. Beranek, *Noise and Vibration Control*, pp. 370-376, 2d edition, Institute of Noise Control Engineering, Cambridge, Massachusetts, 1988.

* cited by examiner

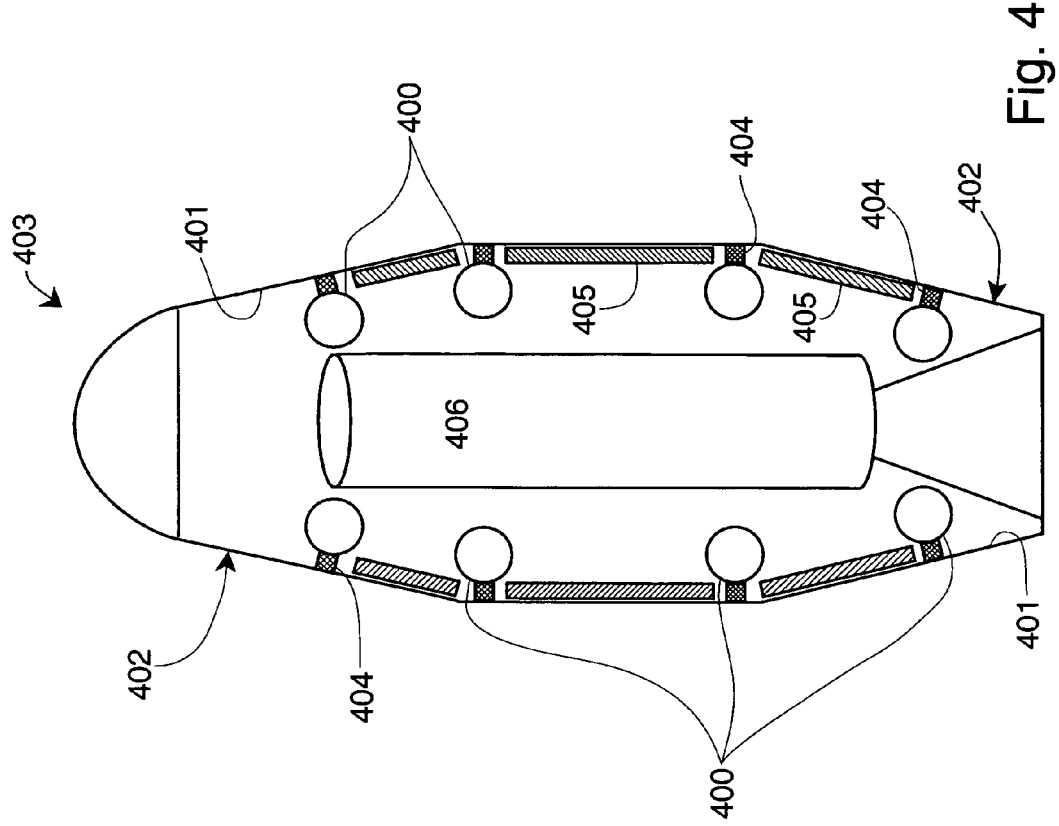

LIGHTWEIGHT ACOUSTIC DAMPING TREATMENT

RIGHT OF THE GOVERNMENT

The invention described herein may be manufactured and used by or for the Government of the United States for all governmental purposes without the payment of any royalty.

BACKGROUND OF THE INVENTION

This invention relates to the field of acoustic damping. More particularly, the present invention is an inflatable elastic membrane that, when inflated, acts as an acoustic resonator to damp acoustic resonances in an enclosed volume, such as that contained by the fairing of a launch vehicle.

Traditional acoustic resonators are fabricated from a rigid material, and enclose a vented volume. A neck usually controls the length of the vent. A well known example of such an acoustic resonator is a wine bottle. An acoustic resonator can be used to reduce acoustic transmission into an enclosed space, such as that of a launch vehicle or an airplane. If the unwanted acoustics are tonal, i.e., occurring at a single frequency or within a narrow bandwidth, the resonator is configured as a reactive device with low damping. Introducing the reactive resonator significantly increases the reactive impedance over a narrow frequency band.

By tuning the resonator, the narrow frequency band may be made to coincide with the tonal disturbance. The disturbance is then partially or completely reflected away from the acoustic space, and its transmission into the space is decreased. If the unwanted acoustics are broadband and the acoustic space has a low number of lightly damped resonances, the resonator may be configured as a resistive device with high damping. Introducing a resistive or damped resonator into the acoustic space adds damping to the acoustic resonances. Although all lightly damped acoustic resonances will tend to increase their damping level by introducing a damped resonator, the largest increase in damping will result at the acoustic resonance to which the resonator is tuned.

Multiple resonators may be used simultaneously to attenuate multiple tones or multiple band widths. In either case, tuning is achieved by varying the volume and/or neck length of a traditional resonator. This tuning process is well understood and has been described in a number of textbooks, for example, Philip M. Morse & K. Uno Ingard, *Theoretical Acoustics* 489-490 (Princeton University Press, 1986), and Leo L. Beranek, *Noise and Vibration Control* 370-376 (2d ed., Institute of Noise Control Engineering, 1988).

The beneficial effect of the resonator is compromised by the volume it occupies. Furthermore, the use of an acoustic resonator is limited by its weight, especially when multiple resonators are required. Prior art acoustic resonators are described in the following patents:

U.S. Pat. No. 6,493,180, "Hard Disk Drive Cover That Contains a Helmholtz Resonator Which Attenuates Acoustic Energy," issued Dec. 10, 2002; U.S. Pat. No. 6,485,205, "Media Weight Sensor Using an Acoustic Resonator," issued Nov. 26, 2002; U.S. Pat. No. 6,151,396, "Active Acoustic Resonator for Abating Noise," issued Nov. 21, 2000; and U.S. Pat. No. 6,116,375, "Acoustic Resonator," issued Sep. 12, 2000.

There is a need in the art for a lightweight, compact resonator that can be tuned to damp low frequency acoustic resonances occurring in an enclosed volume, as well as provide broadband reduction for higher frequency resonances. The present invention fulfills this need in the art.

SUMMARY OF THE INVENTION

Briefly, the present invention is an inflatable elastic membrane that, when inflated, acts as a resistive acoustic resonator to passively damp acoustic resonances in an enclosed volume, and particularly in the fairing of a flight or launch vehicle. Since the elastic material properties and the gas pressure inside the membrane structure determine the acoustic coupling, damping, and resonance for the membrane, the inflatable elastic membrane can be tuned to target specific low-frequency modes that are not attenuated by traditional passive acoustic blankets.

The membrane of the present invention can have various geometries, and be inflated with a variety gases, thus providing a lightweight and rugged apparatus. The inflating gases may be other than air, such as helium, for introducing an acoustic impedance mismatch to further reduce the amplitude of acoustic waves propagating in the enclosed volume being damped.

The membrane of the present invention can also include a pressure relief valve to vent the membrane during the ascent of a flight vehicle to higher altitude, as well as an inflation valve to inject pressurized gas into the membrane during descent. The present invention can also include a pressure regulator to maintain the desired gauge pressure within a plurality of inflatable membranes by simultaneously controlling their respective inflation and pressure relief valves. Acoustic blankets can also be attached to the internal walls of the vehicle and around the inflated membranes, to abate frequencies greater than 500 Hz.

Other aspects and advantages of the present invention will become apparent from the following detailed description, taken in conjunction with the accompanying drawings, and illustrating by way of example the principles of the invention.

BRIEF DESCRIPTION OF THE DRAWINGS

FIG. 4 is an illustration of multiple membranes of the present invention deployed inside a launch vehicle fairing containing a payload.

DETAILED DESCRIPTION

The invention is an acoustic resonator comprised of an elastic membrane inflated with helium or another gas. Since the elastic membrane significantly affects acoustic coupling and damping, the resonator can be configured as either reactive or resistive. A resistive resonator might use a membrane composed of an elastomer, whereas a reactive device might use a stiffer material such as Mylar® polyester film. (Mylar® is a registered trademark owned by Dupont Tejjin Films, for a family of plastic film products made from the resin Polyethylene Terephthalate ("PET").) Since an inflated membrane would be lightweight, the weight penalty associated with using such a device in a launch vehicle would be negligible. However, in order for the device to function optimally as a resonator, it must be properly tuned. An understanding of the tuning process requires a preliminary comprehension of how the inflated membrane would function as a resistive resonator.

Figure 1:
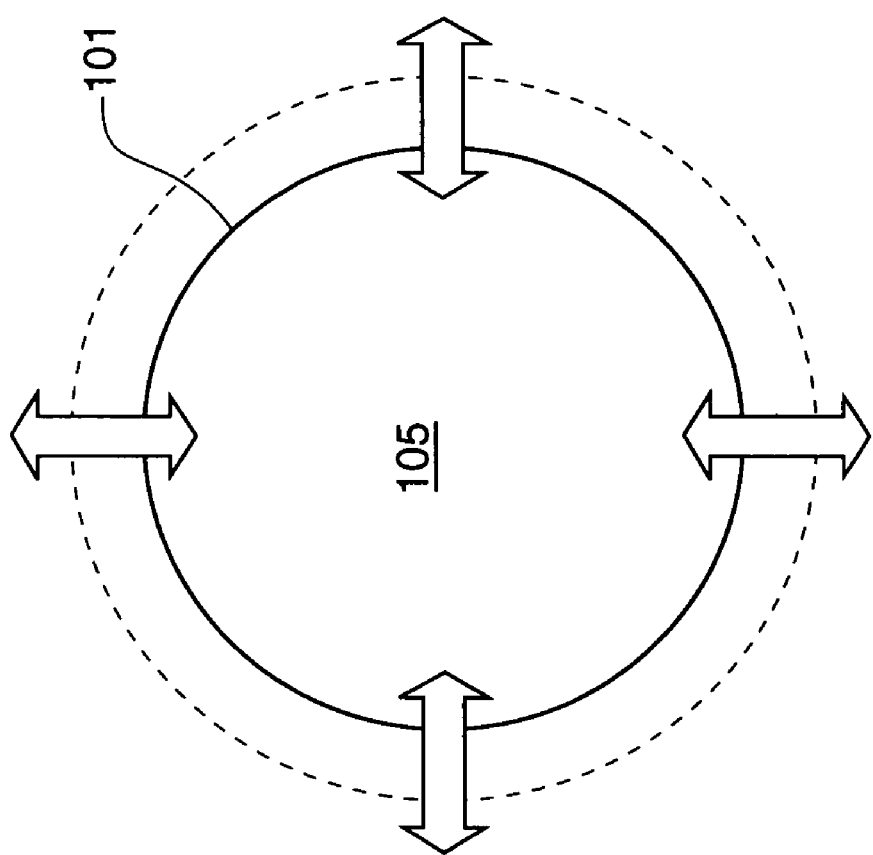
FIG. 1 illustrates the radial breathing motion of an inflated spherical membrane of the present invention.

An elastic membrane functions most effectively as a passive resistive resonator when its "breathing" mode is tuned to the frequency of interest. The breathing mode for inflatable, elastic spherical membrane 101 inflated with gas 105 is illustrated in FIG. 1. The breathing mode for spherical membrane 101 can be predicted by augmenting the equations of motion for a spherical membrane with the spring stiffness of gas 105. The stiffness of spherical membrane 101 is related to the composition of the membrane material, the internal pressure created by gas 105, and the volume enclosed by spherical membrane 101. The equations of motion of spherical membrane 101 are well known by those skilled in the relevant art. Since these equations are nonlinear, the membrane material is highly nonlinear, and the radial breathing motion is relatively substantial for high acoustic levels, the prediction of frequency is approximate and must be augmented by empirical testing. For geometries other than a sphere, empirical testing would be the most efficient method of determining damping ratios and resonance frequencies.

To achieve the desired attenuation, it is necessary to obtain a high degree of acoustic coupling of a resistive acoustic resonator to an enclosed acoustic volume containing the resonator. The breathing mode of spherical membrane 101 has extremely good coupling to the acoustic volume that surrounds it for two reasons: the radial breathing motion of the membrane's surface is uniform in phase, and the mechanical impedance of the membrane material does not restrict the absorption of energy. Membrane 101 "breathes" uniformly, increasing and decreasing in volume, but maintaining its shape. In acoustic literature, a spherical membrane that exhibits a breathing mode would be described as a highly efficient spherical radiator. By reciprocity, a spherical radiator is not only a good generator of acoustics, but is also likely to be easily excited by acoustics.

In addition to the radial breathing motion of inflated spherical membrane 101, the mechanical impedance of the membrane also affects coupling. For example, a relatively compliant, damped device is easily driven into motion by an acoustic excitation, whereas a relatively rigid structure is not. This occurs because, although the breathing mode of both the compliant and rigid device may be tuned so that their respective resonances correspond to the disturbance frequency, the amount of response of each resonator is governed by the moving mass and the amount of damping. Given the same disturbance level and the same damping, the compliant structure would exhibit more motion and absorb more energy, since it has less mass per unit area. For the resonator to couple well and absorb energy, it should have relatively high damping and low mass. There is an optimum value of impedance that maximizes absorption of acoustic energy. The choice of gas, membrane material and inflated volume all determine the degree of coupling and, concomitantly, the effectiveness in attenuating acoustic resonant response.

The effectiveness of the inflatable membrane acoustic resonator is not restricted to tuning only the breathing mode to the target acoustic resonance. Significant damping of acoustic modes in a fairing can also be achieved by tuning higher frequency resonances (above the fundamental breathing mode) to coincide with the acoustic resonances. As long as the resonance frequencies of the membrane structure are proximal to the acoustic resonances, there will be efficient coupling, and thus enhanced acoustic damping of the acoustic response.

At frequencies for which the membrane resonances do not coincide with acoustic resonances, membrane 101 will still passively absorb incident acoustic waves. Acoustic energy is dissipated as heat when acoustic waves interact with the membrane structure and cause membrane 101 to vibrate. The mechanical vibrations are damped out by friction between the molecules of the membrane material as the mechanical waves propagate along the membrane. As the resulting acoustic waves pass through membrane 101 and into gas 105, additional energy loss is realized through molecular friction resulting from wave interactions with the gas molecules.

If helium gas is used to inflate membrane 101, the aforementioned loss due to molecular friction is enhanced because helium gas is very dissipative to acoustic energy. Also, the existence of a secondary boundary, i.e., the inflatable membrane structure, within the enclosed volume will cause an impedance mismatch to acoustic waves propagating therein. The acoustic mismatch will be a function of frequency, membrane material, and the nature of the gas used to inflate membrane 101. The acoustic mismatch will cause scattering of acoustic waves, and hence provide additional dissipation of acoustic energy. This effect will increase with the introduction of more membranes 101 into the enclosed volume.

Figure 2:
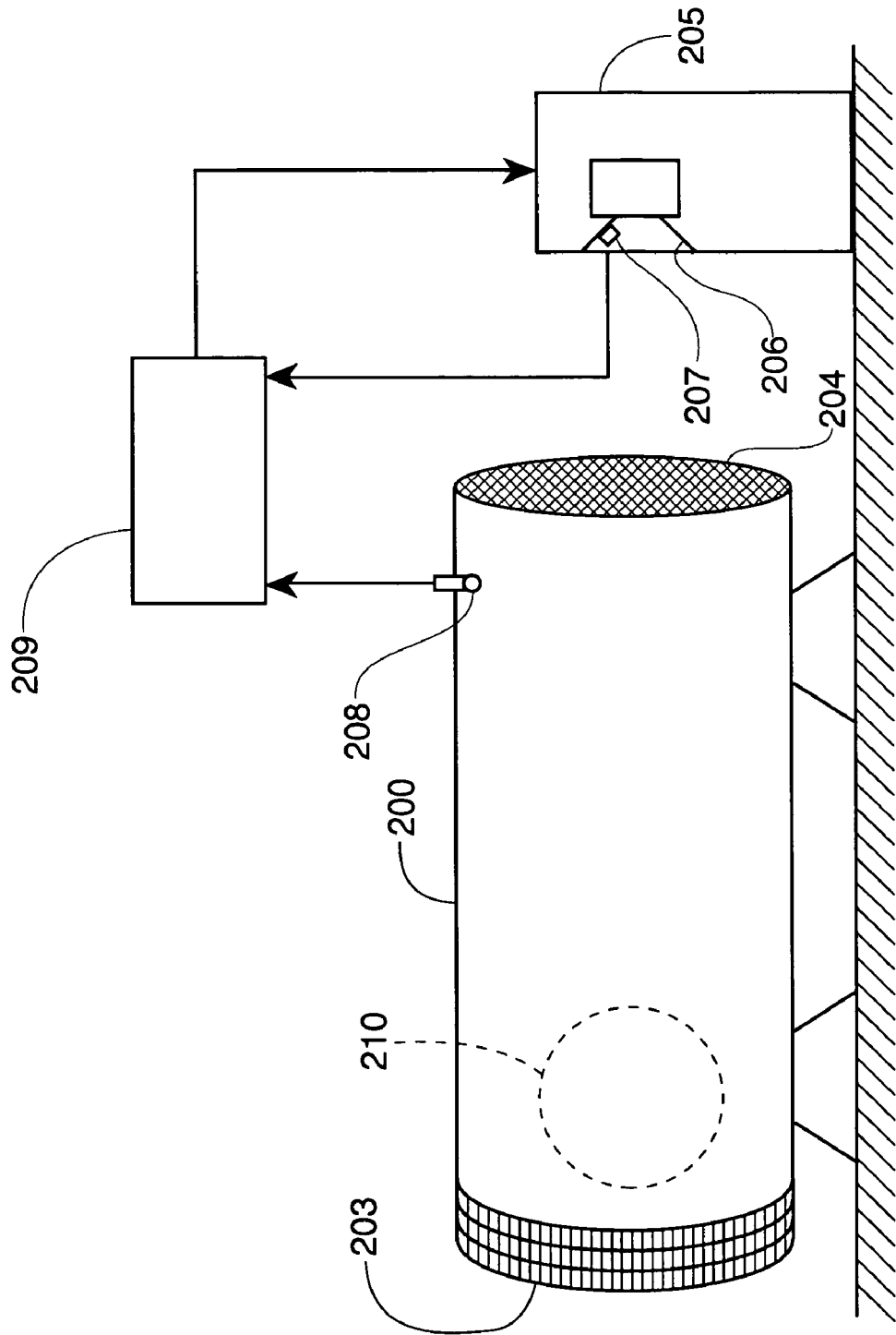
FIG. 2 is an illustration of the setup used to test the present invention.

A test was performed to verify that a helium-filled spherical membrane tuned such that its breathing mode corresponds to the first acoustic resonance of a hollow cylinder containing the membrane, will reduce the acoustic response in the cylinder. The experimental setup is shown in FIG. 2. Hollow cylinder 200 was 84 inches long, 20 inches in diameter and constructed from ¼-inch thick aluminum. One end of cylinder 200 was terminated with a rigid, 1.5-inch thick particleboard end cap 203, while the other end was terminated with a relatively compliant ⅛-inch thick aluminum plate 204. End plate 204 introduces structural dynamics into the acoustic transmission path, which is representative of the acoustic transmission path in real launch vehicle fairings. Acoustic speaker 205, including diaphragm 206, was placed directly outside end plate 204 for the purpose of generating random acoustic noise. Accelerometer 207 was attached to diaphragm 206 as a reference sensor to indicate the source strength and spectrum of the acoustic disturbance generated by speaker 205. Microphone 208 was placed inside cylinder 200 to measure the acoustic response resulting from the external acoustic disturbance created by speaker 205.

Spectrum analyzer 209 was used to generate random noise that was input to speaker 205, and to measure the signals from microphone 208 and accelerometer 207. Spectrum analyzer 209 also computed the transfer function (or frequency response function) between accelerometer 207 and microphone 208. The transfer functions show the structural and acoustic resonances in the transmission path, and their relative magnitudes. The test was performed twice: with cylinder 200 being empty and, again, with spherical (4-inch radius), flexible membrane 210 inflated with helium gas and fixedly located inside cylinder 200.

Figure 3:
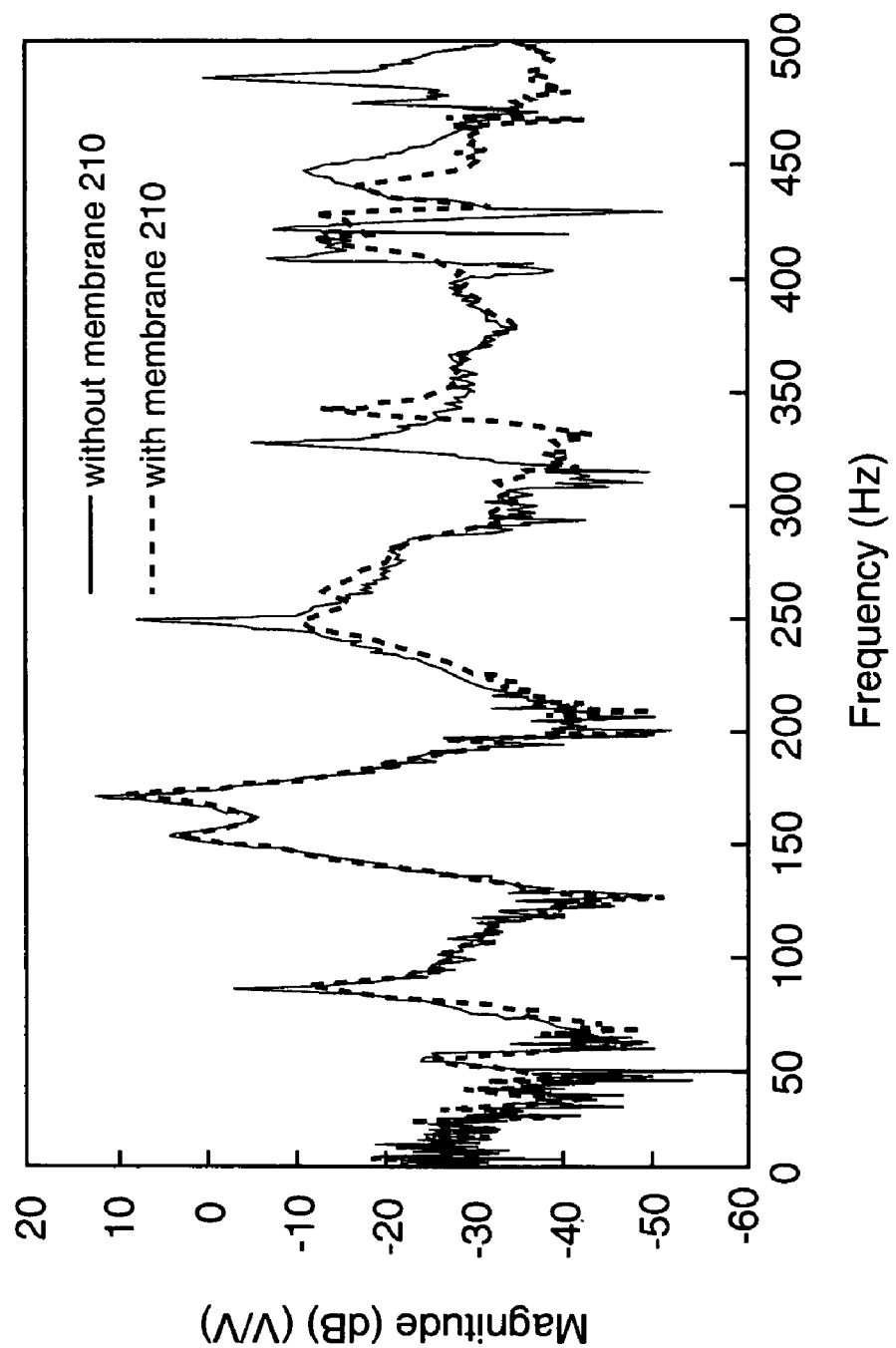
FIG. 3 is a frequency response plot showing the acoustic attenuation achieved by the present invention when tested using the setup illustrated in FIG. 2.

FIG. 3 shows the transfer function of empty cylinder 200 as a solid line. The spectrum exhibits several lightly damped resonances. The first acoustic resonance of cylinder 200 was at approximately 80 Hz. There were also acoustic modes in cylinder 200 at approximately 160 Hz and 240 Hz. End plate 204 introduced a structural resonance at approximately 175 Hz.

FIG. 3 also includes an overlaid plot of the transfer function measured with membrane 210 inflated with helium gas to form a sphere, and attached to the interior of cylinder 200 near rigid end cap 203. Spherical membrane 210 was tuned to 80 Hz to match the first acoustic resonance of cylinder 200. As shown by comparing the two plots, the presence of membrane 210 reduced the amplitude of the first resonance (80 Hz) by approximately 8 dB. There was little effect at the second acoustic resonance or the first structural resonance. However, there was significant attenuation of higher order acoustic resonances. The third acoustic resonance at 240 Hz was attenuated by approximately 20 dB. This demonstrates that the present invention can effectively target low frequency resonances, as well as provide broadband reduction for higher frequency resonances. It is noteworthy that the aforementioned reduction in resonance amplitude was achieved with a device, i.e., membrane 210, that was lighter than air, (uninflated weight of 7.3 grams) and occupied approximately 1% of the volume of cylinder 200.

FIG. 4 illustrates multiple membranes 400 of the present invention, all of which are attached to the inside fairing wall 401 of fairing 402 of flight vehicle 403. Membranes 400 are each constructed from an elastic polymer material, and each is inflated with helium gas to form a sphere. Membranes 400 are each attached to inside fairing wall 401 with single point attachment hardware 404, with the attachment hardware including an inflation valve and a pressure relief valve (not shown). Each of membranes 400 is tuned to a different frequency to provide a broad band of noise attenuation; that is, each of membranes 400 is tuned so that at least one of membranes 400 couples with each of the first acoustic resonances occurring in fairing 402.

The pressure relief valve exhausts gas during the ascent of flight vehicle 403 to maintain the desired coupling pressure and prevent the membrane from rupturing due to the decrease of ambient atmospheric pressure. The inflation valve fluidly communicates with a reservoir of pressurized gas (not shown) and provides for inflation of the membrane during descent to maintain the coupling pressure. During flight, a sensor (not shown) senses the ambient atmospheric pressure and continuously sends signals to a regulator (not shown), which controls the respective pressure relief and inflation valves for membranes 400 to maintain the respective coupling pressures. There are a variety of such pressure regulation systems and devices commercially available, and well known to those skilled in the mechanical arts. Any of such systems may be incorporated and used with the present invention in order to regulate the membrane pressures as described herein.

Acoustic blankets 405 are attached to inside fairing wall 401, and abate high frequency noise, e.g., greater than 500 Hz. Fairing 402 also contains payload 406. Even when fully inflated, membranes 400 do not interfere with the operation or deployment of payload 406.

Figure 5B:
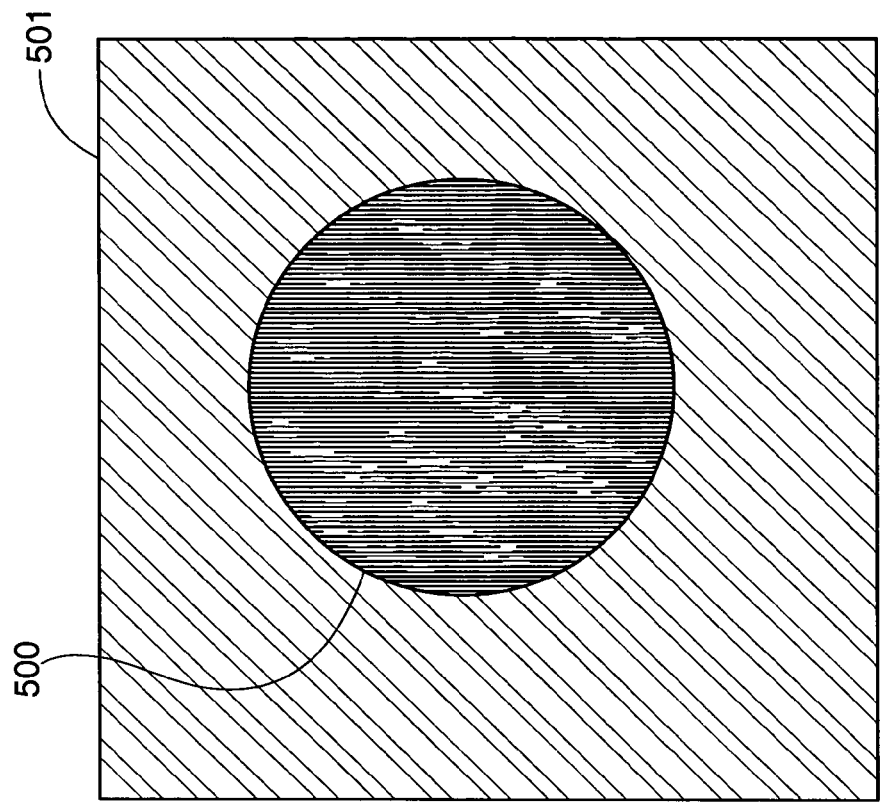
FIGS. 5A and 5B illustrate side and front views, respectively, of an inflated membrane of the present invention having an elliptical cross-section.
Figure 5A:
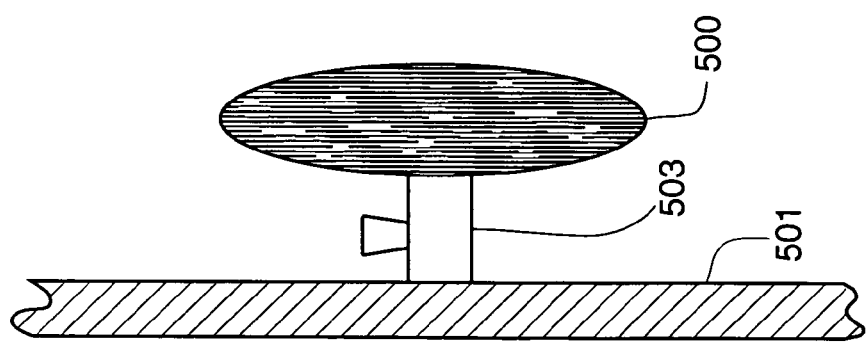

FIGS. 5A and 5B illustrate inflatable membrane 500, another embodiment of the present invention. Membrane 500 is inflated with a gas and attached to the inside fairing wall 501 of a flight vehicle. FIG. 5A provides a side view and FIG. 5B shows a front view of membrane 500. Attachment hardware 503 includes a pressure regulating system (not shown) to alternatively exhaust gas from membrane 500 and inject gas into membrane 500 during the trajectory of the flight vehicle, to maintain the gauge pressure of membrane 500 at the level necessary to couple it with the first acoustic resonance of the volume contained by the fairing. Membrane 500 is constructed from elastic polymer material and, as particularly shown by FIG. 5A, forms a shape that has an elliptical cross-section when inflated. Although having a non-spherical shape when inflated, membrane 500 can still be tuned to act as an acoustic resonator to increase the damping of acoustic resonances, and thereby dissipate acoustic energy in the fairing of a flight vehicle in the manner previously discussed in conjunction with spherical membrane 101.

Other variations of geometry are also intended to be covered by this invention, such as flattened, rectangular-shaped membranes. Furthermore, a membrane of the present invention can be inflated with a gas other than helium, or gas mixtures, such as air. It should also be noted that a membrane of the present invention can be fabricated from one of a variety of elastic non-polymer materials that offer tuning properties different from those of the elastic polymers previously disclosed herein.

It is to be understood that the preceding is merely a detailed description of several embodiments of this invention and that numerous changes to the disclosed embodiments can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. An apparatus for damping acoustic resonances, comprising:
    a flexible membrane located within an enclosure;
    the enclosure containing an enclosed gas and having a first acoustic resonance;
    the membrane for being tuned to couple with the first acoustic resonance by being inflated to a gauge pressure;
    the enclosed gas being at ambient atmospheric pressure; and
    a pressure regulation means for maintaining the gauge pressure at an approximately constant value,
    whereby
    the first acoustic resonance has a magnitude that is attenuated by the inflated membrane.

2. An acoustic damping apparatus as defined by claim 1 wherein:
    the enclosure has a plurality of acoustic resonances respectively occurring at a plurality of frequencies; and
    the first acoustic resonance occurring at a first frequency that is lowest of the plurality of frequencies.

3. An acoustic damping apparatus as defined by claim 1 wherein the inflated membrane has a spherical shape when inflated to the gauge pressure.

4. An acoustic damping apparatus as defined by claim 1 wherein the inflated membrane has an elliptical cross-section when inflated to a gauge pressure that couples with the first acoustic resonance.

5. An acoustic damping apparatus as defined by claim 1 wherein the membrane is a resistive acoustic resonator fabricated from an elastomeric material.

6. An acoustic damping apparatus as defined by claim 1 wherein
    ambient atmospheric pressure varies as a function of time.

7. An acoustic damping apparatus as defined by claim 1 further comprising:
    a plurality of the membranes being located within the enclosure; wherein
    the enclosure has a plurality of acoustic resonances, with the plurality of the membranes numbering at least that of the plurality of the acoustic resonances;
    each of the membranes is tuned to couple with one of the acoustic resonances by being inflated to a respective gauge pressure, with each of the acoustic resonances being coupled with at least one of the inflated membranes;

the pressure regulation means is for maintaining the gauge pressures at approximately constant values, respectively;

the plurality of acoustic resonances respectively occur at a plurality of frequencies; and the first acoustic resonance occurs at a first frequency that is the lowest of the plurality of frequencies, whereby each of the acoustic resonances has a magnitude that is attenuated.

8. An acoustic damping apparatus as defined by claim 7 wherein ambient atmospheric pressure varies as a function of time.

9. An acoustic damping apparatus as defined by claim 7 wherein each of the inflated membranes has a spherical shape when inflated to its respective gauge pressure.

10. An acoustic damping apparatus as defined by claim 1 wherein the pressure regulation means includes an inflation valve for injecting an inflation gas into the membrane, a pressure relief valve for exhausting the inflation gas from the inflated membrane, and a regulator for controlling the inflation valve and the pressure relief valve.

11. An acoustic damping apparatus as defined by claim 1, further comprising:

attachment hardware for attaching the membrane to the enclosure; wherein the attachment hardware includes the pressure regulation means.

12. A method for damping acoustic waves transmitted by a transmitting gas within an enclosure being at atmospheric pressure and having an acoustic resonance, comprising:

inflating a flexible membrane with an inflation gas to form an inflated membrane at a gauge pressure that couples the inflated membrane with the acoustic resonance;

placing the inflated membrane within the enclosure, and maintaining the gauge pressure at an approximately constant value by compensating for changes in atmospheric pressure.

13. A method for damping an acoustic resonance as recited in claim 12, wherein compensating for changes in ambient atmospheric pressure includes:

continuously sensing ambient atmospheric pressure to obtain a sensed ambient atmospheric pressure; and exhausting a first quantity of the inflation gas from the inflated membrane or injecting a second quantity of the inflation gas contained in a reservoir into the inflated membrane, responsive to the sensed ambient atmospheric pressure.

14. A method for damping acoustic waves transmitted by a transmitting gas within an enclosure being at atmospheric pressure and having a plurality of acoustic resonances, comprising the steps of:

inflating a plurality of flexible membranes with an inflation gas to form a plurality of inflated membranes at gauge pressures that respectively couple each of the inflated membranes with one of the acoustic resonances, with each of the acoustic resonances being coupled with at least one of the inflated membranes;

placing the membranes at fixed stations, respectively, within the enclosure; and maintaining each of the gauge pressures at an approximately constant value, respectively, by compensating for changes in ambient atmospheric pressure.

15. A method for damping a plurality of acoustic resonances as recited in claim 14, wherein compensating for changes in ambient atmospheric pressure includes:

continuously sensing ambient atmospheric pressure to obtain a sensed ambient atmospheric pressure; and exhausting first amounts of the inflation gas from each of the inflated membranes, respectively, or injecting second amounts of the inflation gas contained in a reservoir into each of the inflated membranes, respectively, responsive to the sensed ambient atmospheric pressure.

* * * * *